United States Patent
Welles, II et al.

(10) Patent No.: US 6,873,924 B1
(45) Date of Patent: Mar. 29, 2005

(54) METHOD AND SYSTEM FOR CALIBRATING RELATIVE FIELDS OF VIEW OF MULTIPLE CAMERAS

(75) Inventors: Kenneth Brakeley Welles, II, Scotia, NY (US); Timothy Patrick Kelliher, Scotia, NY (US); Peter Henry Tu, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/674,486

(22) Filed: Sep. 30, 2003

(51) Int. Cl.$^7$ ............................................. G06F 19/00
(52) U.S. Cl. .......................................... 702/94; 702/85
(58) Field of Search ...................... 73/1.01, 1.79; 348/135; 356/614; 382/286, 289; 396/322, 325, 661; 702/33, 40, 85, 94, 95, 105, 127, 150, 151, 152, 153

(56) References Cited

U.S. PATENT DOCUMENTS

| | | | | |
|---|---|---|---|---|
| 5,159,361 A | * | 10/1992 | Cambier et al. | 351/212 |
| 5,699,444 A | * | 12/1997 | Palm | 382/106 |
| 5,768,443 A | * | 6/1998 | Michael et al. | 382/294 |
| 5,832,106 A | * | 11/1998 | Kim | 382/154 |
| 5,889,550 A | * | 3/1999 | Reynolds | 348/139 |
| 6,101,455 A | * | 8/2000 | Davis | 702/94 |
| 6,359,647 B1 | * | 3/2002 | Sengupta et al. | 348/154 |
| 6,700,669 B1 | * | 3/2004 | Geng | 356/603 |
| 6,710,765 B1 | * | 3/2004 | Kato et al. | 345/156 |
| 6,741,757 B1 | * | 5/2004 | Torr et al. | 382/294 |
| 6,778,282 B1 | * | 8/2004 | Smets et al. | 356/614 |
| 6,789,039 B1 | * | 9/2004 | Krumm | 702/150 |
| 2002/0136444 A1 | * | 9/2002 | Brown et al. | 382/154 |
| 2003/0144815 A1 | * | 7/2003 | Kohler et al. | 702/159 |
| 2003/0151720 A1 | * | 8/2003 | Chernyak et al. | 351/206 |

\* cited by examiner

*Primary Examiner*—Michael Nghiem
(74) *Attorney, Agent, or Firm*—Fletcher Yoder

(57) ABSTRACT

A method for calibrating cameras includes moving a point of light on a first flat surface. A first and a second camera are capable of generating a first frame and a second frame of the point of light respectively. The respective points of light are in a first and a second field of view of the first and second camera. The method includes determining a relative position between the first camera and the second camera based in part on the first frame and the second frame.

21 Claims, 5 Drawing Sheets

METHOD AND SYSTEM FOR CALIBRATING RELATIVE FIELDS OF VIEW OF MULTIPLE CAMERAS

BACKGROUND OF THE INVENTION

The present disclosure relates generally a method and system of calibrating cameras. More particularly, the present disclosure relates to a method and system of calibrating cameras having non-overlapping fields of view.

Multiple cameras are calibrated to allow a large space to be observed. Such an area may be a room that is under surveillance for security purposes. These cameras are often connected to several monitors to be viewed by a security professional in a single location.

Historically, determining the position and orientation of multiple cameras relative to each other has been a difficult and inaccurate procedure. The process required placing an object, such as a person, in a common field of view of two cameras. However, the irregularly shaped object and common field of view, or overlap, constrained the accuracy and limited the breadth of the surveillance system.

Accordingly, there is a continuing need to calibrate cameras that do not have overlapping fields of view to eliminate one or more of the aforementioned and other drawbacks and deficiencies of prior calibration surveillance systems and methods.

BRIEF DESCRIPTION OF THE INVENTION

A method for calibrating cameras is provided. The method includes a moving a point of light on a first flat surface. A first and a second camera are provided to generate a first frame of the point of light and a second frame of the point of light. The respective points of light are in a first field of view and a second field of view of the first and the second cameras. The method includes determining a relative position between the first and second camera based in part of the first and second frames.

A method for calibrating cameras is provided. The method includes moving a point of light. The method also includes generating a first frame when the point of light is in a first field of view of the first camera and generating a second frame when the point of light is in a second field of view of a second camera; the first and the second field of view need not overlap. The method further includes capturing data including the times of the first and second frames. The method further includes determining a relative position between the first and the second cameras based at least in part of the first and the second times.

A system for camera calibration is provided. The system includes a light source generating a point of light on a flat surface. The system further provides means for moving the point of light through a predefined path, such that the path is definable through a field of view of the first and second cameras. The system further comprises a controller connectable to the first and second cameras so that the controller can capture a first frame from said first camera when said predefined path is within a first field of view and a second frame from said second camera when said predefined path is within second field of view. The system further includes a controller configured to determine an angle of the first camera with respect to the second camera based at least in part on the first and second frames.

The above-described and other features and advantages of the present disclosure will be appreciated and understood by those skilled in the art from the following detailed description, drawings, and appended claims.

DETAILED DESCRIPTION

Figure 1:
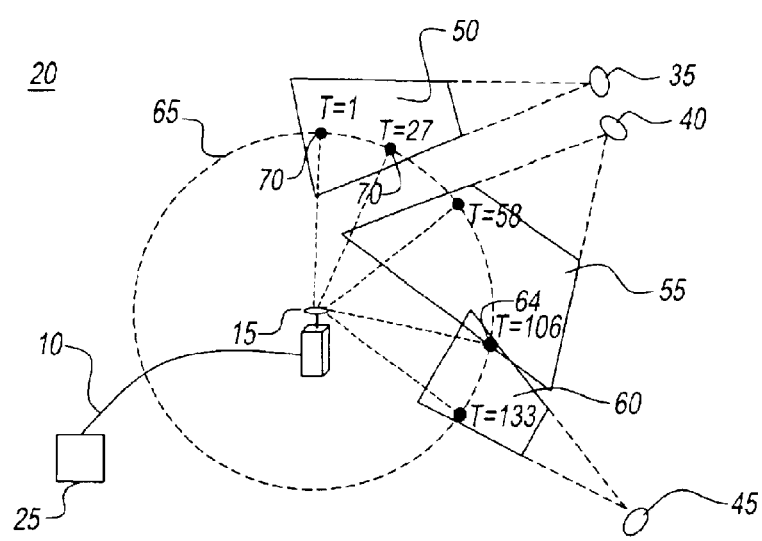
FIG. 1 a top view of a camera calibration system.

Referring now to the drawings and in particular to FIG. 1, an exemplary embodiment of a camera calibration system generally referred to by reference numeral 10 is illustrated. For the purposes of this invention, calibration means the orientation and/or position of cameras. System 10 has very few components configured to calibrate cameras observing flat surface 20. System 10 has a light source 15 to project a point of light 70 through a known trajectory such as a circle 65 and a controller 25 to collect data, coordinate multiple cameras and to compute relative camera positions. System 10 can calibrate numerous cameras; however, for purposes of illustration, three surveillance cameras 35, 40 and 45 are shown. Each camera 35, 40 and 45, has a respective field of view 50, 55 and 60 on flat surface 20.

Figure 2:
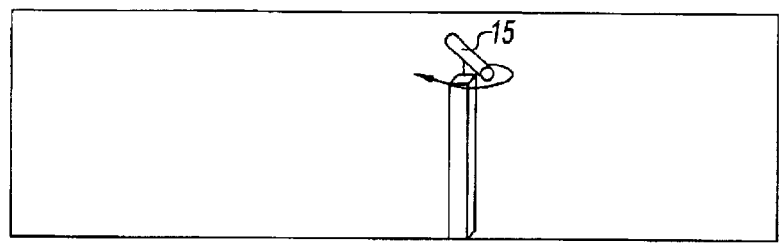
FIG. 2 is a side view of a light source of FIG. 1.
Figure 18:
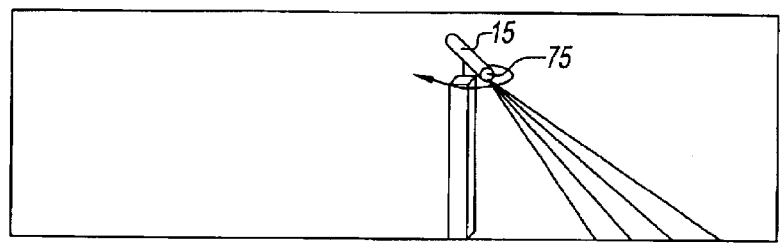
FIG. 18 is a side view of a second embodiment of the light source.

Referring now to the drawing of FIG. 2, a side view of alight source 15 is shown. Light source 15, is capable of projecting point of light 70 on flat surface 20. Point of light 70 could be from any light source; however, the most accurate calculations will be achieved by using a light source capable of producing a focused point on surface 20. Further, light source 15 projects point of light 70 through circle 65, a mathematically describable trajectory. Light source 15, is moved by a rotating device; however, any other device such as an oscillating device, could be used if it projects point of light 70 in a mathematically describable trajectory. In the exemplary embodiment of FIG. 1, light source 15 is configured to move at a constant rate of 5 RPM and controller 25 is configured to operate cameras 35, 40 and 45 to capture 12 seconds of video data or 360 frames of data at a rate of 30/frames per second for each camera.

Referring to FIG. 1, surface 20 can be any flat surface including for example a wall, a ceiling or a floor. In FIG. 1, light source 15 projects point of light in circle 65; however, any mathematically describable trajectory such as an ellipse, a parabola or a line could be used. Also, light source 15 projects point of light 70 into fields of view 50, 55 and 60. Cameras 35, 40 and 45 are mounted at an angle with respect to an axis perpendicular to flat surface 20; therefore projected point of light 70 will appear to move in an ellipse instead of a circle.

Referring now to FIGS. 1, 3–17, controller 25 and each camera 35, 40 and 45 are capable of being operatively connected to exchange data. Controller 25 captures data from FIGS. 3–14, representing frames from each camera, including those frames containing an image of the point of light in fields of view 50, 55 and 60. Controller 25 also captures the time each frame is taken for each respective camera. Each camera 35, 40 and 45 has a known focal length and a charge coupled device or other imaging device of known size that allow controller 25 to make calibration computations.

Figure 3:
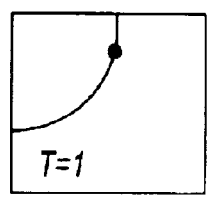
FIGS. 3 through 7 are frames of a field of view of a first surveillance camera.

Referring to FIGS. 1 and 3, for each camera 35, 40 and 45, controller 25 creates coordinates of a point of light from the field of view of each camera frame in which point of light 70 appears. For example, in FIG. 3, controller 25 creates coordinates for point of light 70. For circle 65, controller 25 must capture at least four frames from each camera containing point of light 70 to generate coordinates, because four points uniquely define an ellipse. For other trajectories, two points could be used to define the trajectory. Controller 25 can then calculate for each camera an ellipse described by the four points of light that passed through their respective fields of view. Controller 25 is capable of calculating the angle in between cameras 35 and 40, with respect to the center of circle 65 by knowing the time a particular frame from camera 35 captures point 70 and where point 70 would be located at that same time along the ellipse viewed by camera 40.

Figure 8:
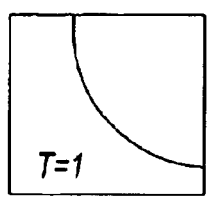
FIGS. 8 through 12 are frames of a field of view of a second surveillance camera.
Figure 13:
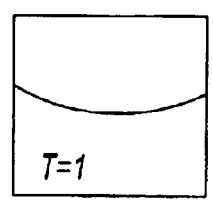
FIGS. 13 through 17 are frames of a field of view of a third surveillance camera.
Figure 4:
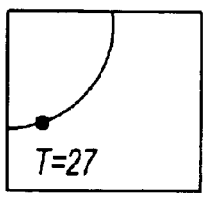
Figure 9:
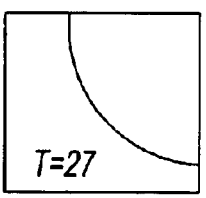
Figure 14:
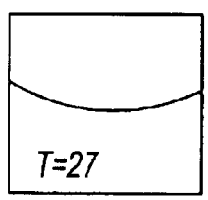
Figure 5:
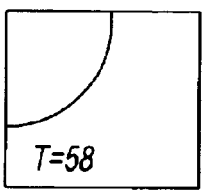
Figure 10:
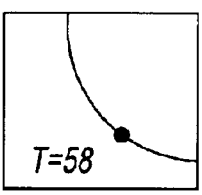
Figure 15:
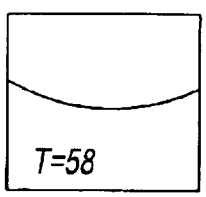
Figure 6:
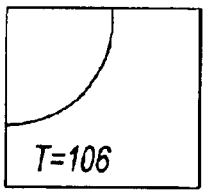
Figure 11:
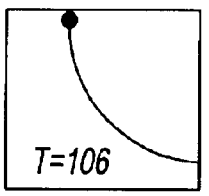
Figure 16:
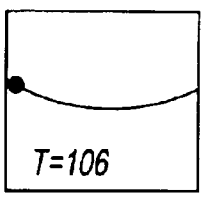
Figure 7:
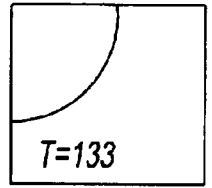
Figure 12:
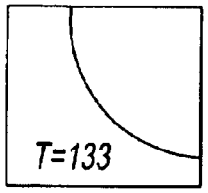
Figure 17:
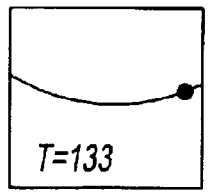
Figure 19:
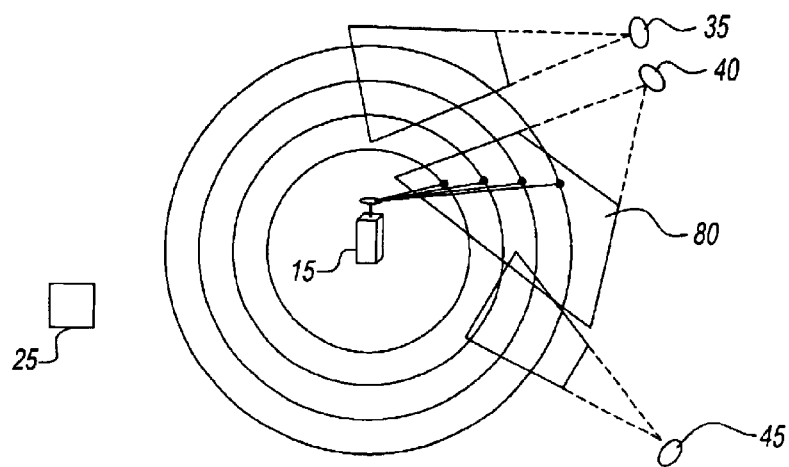
FIG. 19 is a top view of a camera calibration system using a second embodiment of the light source.

FIGS. 3–7 represent frames of field of view 50 of camera 35. For example, at time t=1 and t=27, point of light, 70 appears in field of view 50 represented by FIGS. 3 and 4. At t=1 and t=27, the same point of light 70 does not appear in FIGS. 8 and 9 representing frames of field of view 55 for cameras 40. At t=1 and t=27, the same point of light 70 also does not appear in FIGS. 13 and 14 representing frames of field of view 60 for cameras 45. Similarly, at time t=106, point of light 70 appears in fields of view of 55 and 60, or FIGS. 11 and 16, respectively.

The method of the invention will be explained by way of example. In reference to FIG. 1, a first camera 35 and a second camera 40 are oriented to have fields of view 50 and 55, respectively, on flat surface 20. The fields of view 50 and 55 do not overlap. Knowing the focal length of each lens, the size of the imaging chip and geometric relationships between cameras 35 and 40 and flat surface 20, respective distances from the center of circle 65 can be determined. Cameras 35 and 40 are then calibrated with respect to each other by based in part on capturing frames of data for each camera in which point of light 70 appears. For example, in FIG. 1, calibrating cameras 35 and 40 is accomplished, by knowing the location of point 70 at frames t=1 through t=30 in field of view 50 and where on the ellipse in field of view 55 point 70 would appear at frames t=58 through t=106. Of course, other trajectories could be used to generate similar points of light 70 having different trajectories in frames.

The calibration system 10 can calibrate cameras 35 and 40 whether their fields of view overlap or not. For example, system 10 can also calibrate cameras 40 and 45, that have overlapping fields of view 55 and 60, respectively. System 10 can calibrate cameras having respective fields that overlap entirely at 100% or not at all.

Referring now to FIGS. 19–22, an alternative embodiment of light generation source 15 is shown. In this embodiment, light source 15, contains a beam splitter, 75 such as a diffraction grating. Beam splitter 75 is placed in front of light sources to create four points of light 85, 90, 95 and 100 that area geometrically related. Beam splitting allows more points of light to be collected by controller 25 from each frame; therefore, increasing the accuracy of final positioning results.

Figures 20, 21, 22:
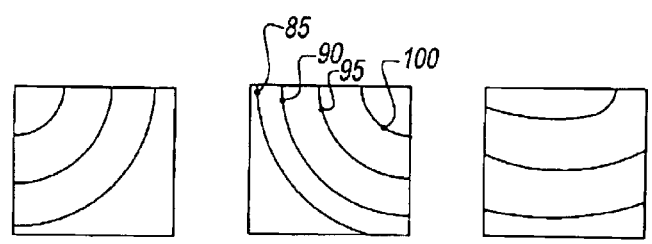
FIGS. 20 through 22 are frames of fields of view using a second embodiment of the light source.
Figure 23:
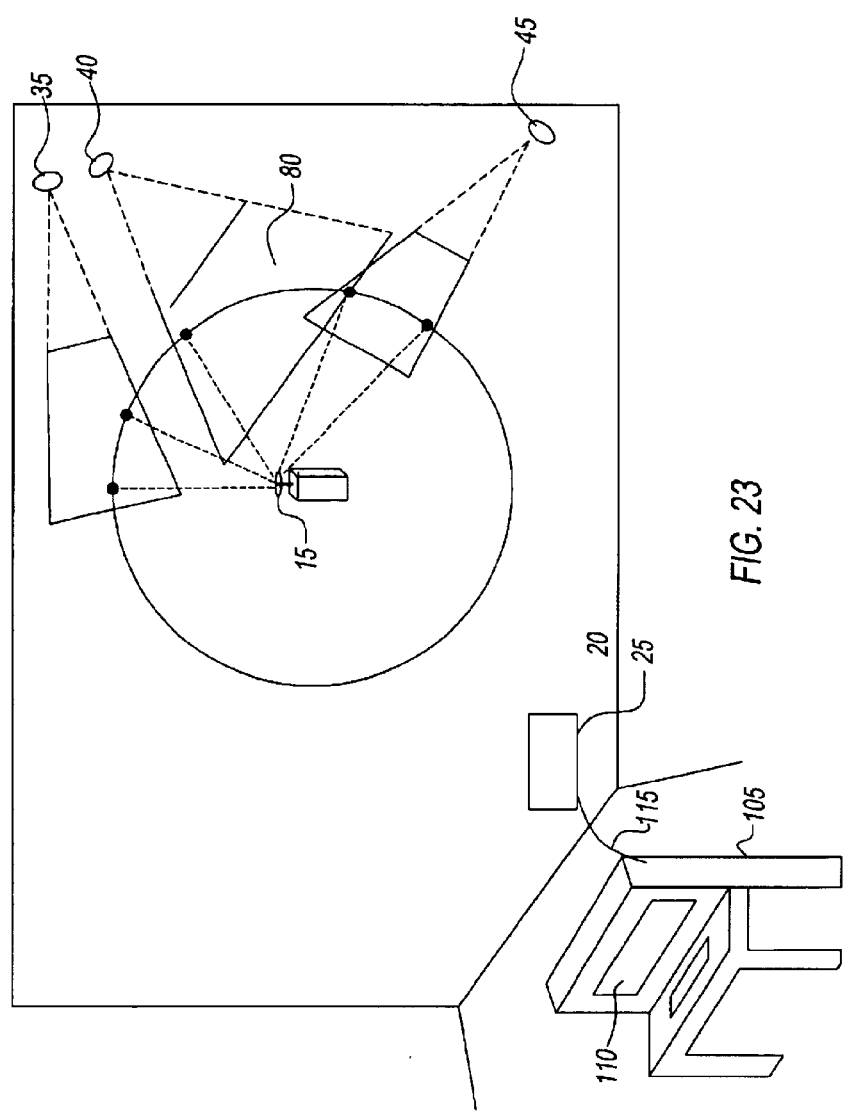
FIG. 23 is a second embodiment of the calibration system having a monitor.

A second exemplary embodiment of calibration system 10 is described with reference to FIG. 20. Again, system 10 has cameras surveillance 35, 40 and 45, light generating source 15, and controller 25. System 10 also includes a security monitor 105 to show a synthetic image 110, flat surface 20, and a connection 115 to connect controller 25 to monitor 105. Once the light generating source has completed camera calibration, it is not needed for any synthetic image generation. Synthetic image 110 is created by appropriate software for such applications resident on controller 25. Synthetic image 110 is a real-time virtual image that can be supplied with actual images of people, for example, as they pass over flat surface 20. Image 10 does not require overlapping fields of view for its creation. In this embodiment, a security professional can view monitor 105 and observe flat surface 20 at one time in synthetic image 110, instead of viewing the flat surface 20 as a series of actual camera images on multiple monitors.

Modeling is another application for system 10. In this application, controller 25, captures data from FIGS. 3–17 and generates three-dimensional constructions of actual three-dimensional objects on flat surface 20. For example, if a person walks over flat surface 20, a synthetic image of flat surface 20 would be generated and the person would be passing through the synthetic image. If only a side view of the person's face were visible, controller 25 would manipulate the data to generate a three-dimensional that persons face.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

What is claimed is:

1. A method for calibrating cameras comprising:
   moving a point of light on a flat surface;
   generating a first frame of said point of light in a first field of view of a first camera;
   generating a second frame of said point of light in a second field of view of a second camera; and
   determining a relative position between said first camera and said second camera based at least in part on said first and said second frames.

2. The method according to claim 1, wherein said first field of view and said second field of view do not overlap.

3. The method according to claim 1, wherein said determination of relative position is based at least in part on two frames.

4. The method according to claim 1, wherein said determination of relative position is based at least in part on four frames.

5. The method according to claim 1, wherein said point of light does not appear in said fields of view simultaneously.

6. The method according to claim 1, wherein said overlap is less than 100%.

7. The method according to claim 6, further comprising generating a single synthetic image from said plurality of first and second frames.

8. The method according to claim 1, wherein said flat surface is selected from the group consisting of a floor, a ceiling, a wall, and any combinations thereof.

9. The method according to claim 1, further comprising capturing a plurality of said first frames and a plurality of said second frames wherein said relative position in between said first camera and said second camera is based in part on said pluralities of said first and said second frames.

10. A method for calibrating cameras comprising:

moving a point of light;

generating a first frame when said point of light is in a first field of view of a first camera;

generating a second frame when said point of light is in a second field of view of a second camera; said first field of view and said second field of view do not overlap;

and capturing data from said first and said second frames, said data includes a first time of said first frame and a second time of said second frame;

determining a relative position between said first and said second cameras based at least in part on said first and said second times.

11. The method according to claim 10, further comprising dividing said point of light into a plurality of points of light prior to moving said points of light.

12. The method according to claim 10, wherein said point of light is moved on a flat surface selected from the group consisting of a floor, a ceiling or a wall, or any combination thereof.

13. The method according to claim 10, further comprising manipulating said first and said second frames to generate a synthetic image of said flat surface.

14. The method according to claim 13, wherein said synthetic image is a three dimensional object.

15. A system for calibrating a first camera and a second camera with respect to one another, comprising:

a light source for generating a point of light on a surface;

means for moving said point of light through a predefined path, said path being definable through a field of view of the said first and said second cameras; and a controller connectable to the first and second cameras so that said controller can capture a first frame from said first camera when said predefined path is within a first field of view of said first camera and a second frame from said second camera when said predefined path is within a second field of view of said field of view the second camera, said controller being configured to determine an angle of the first camera with respect to the second camera based at least in part on said first and second frames.

16. The system according to claim 15, wherein said first field of view and said second field of view do not overlap.

17. The system according to claim 15, wherein said light source is capable of generating multiple points of light.

18. The method according to claim 15, wherein said point of light is located on a second flat surface that is perpendicular to said first flat surface.

19. The method according to claim 15, wherein said controller is capable of manipulating said first and said second frames to generate a synthetic image of said first flat surface.

20. The method according to claim 19, wherein said controller is capable of manipulating said synthetic image.

21. The method of claim 15, wherein said means for moving is selected from the group consisting of a means for rotating, a means for changing a camera angle with respect to said flat surface, and any combinations thereof.

* * * * *